United States Patent
Stickle et al.

(10) Patent No.: US 10,304,349 B1
(45) Date of Patent: May 28, 2019

(54) TEST ENVIRONMENT

(71) Applicant: Amazon Technologies, Inc., Reno, NV (US)

(72) Inventors: Thomas Charles Stickle, Saint James, NY (US); Bruce Cameron Burns, Sammamish, WA (US)

(73) Assignee: Amazon Technologies, Inc., Seattle, WA (US)

(*) Notice: Subject to any disclaimer, the term of this patent is extended or adjusted under 35 U.S.C. 154(b) by 314 days.

(21) Appl. No.: 14/308,605

(22) Filed: Jun. 18, 2014

(51) Int. Cl.
*G09B 7/02* (2006.01)

(52) U.S. Cl.
CPC ..................... *G09B 7/02* (2013.01)

(58) Field of Classification Search
CPC ....... G09B 7/02; G09B 19/00; G09B 19/0053
USPC .......................................... 434/362
See application file for complete search history.

(56) References Cited

U.S. PATENT DOCUMENTS 5,970,490 A * 10/1999 Morgenstern ..... G06F 17/30569
8,250,654 B1 * 8/2012 Kennedy ................. H04L 41/22
713/187

OTHER PUBLICATIONS

API Monitor software overview, authored by rohitab.com. Taken from http://www.rohitab.com/apimonitor on Feb. 13, 2017.*
Wayback Machine filing of API monitor software on May 12, 2013. Taken from http://web.archive.org/web/20130512022636/http://www.rohitab.com/apimonitor on Feb. 13, 2017.*

* cited by examiner

*Primary Examiner* — Robert P Bullington
(74) *Attorney, Agent, or Firm* — Thorpe North & Western, LLP.

(57) ABSTRACT

A technology for providing a test environment is provided. In one example, a method may include defining a macro task for an unstructured lab in a service provider environment, the macro task including a task definition and expected values for a plurality of sub-tasks within the macro task. A request to participate in the unstructured lab may be received from a client device and the macro task may be provided to the client device in response to the request. Metrics may be collected from the unstructured lab using a metrics collector. Completion of the macro task may be analyzed by comparing the metrics to the expected values and a report indicative of performance of the macro task may be provided.

20 Claims, 8 Drawing Sheets

| Task | Subtask | ID | Subtask score | Task score | Verify Method | Verification Instruction |
|---|---|---|---|---|---|---|
| Install Cassandra Cluster Node | | T1 | | 40 | | |
| | Start EC2 instance | T1-A | 2 | | EC2 API | start.instance |
| | Install latest version of Cassandra | T1-B | 8 | | Host Agent | |
| | Install Oracle Java 7 | T1-C | 5 | | Host Agent | |
| | Install dstat | T1-D | 1 | | Host Agent | |
| | install ethtool | T1-E | 1 | | Host Agent | |
| | install make | T1-F | 3 | | Host Agent | |
| | install gcc | T1-G | 3 | | Host Agent | |
| | install s3cmd | T1-H | 3 | | Host Agent | |
| | Attach multiple EBS volumes | T1-I | 4 | | EC2 API | |
| | Configure RAID0 Stripe for data volume | T1-J | 3 | | Host Agent | |
| | Configure independent log volume | T1-K | 1 | | Host Agent | |
| | Attach Elastic Network Interface | T1-L | 2 | | EC2 API | |
| | Attach security group to cluster | T1-M | 2 | | EC2 API | |
| | Set the seed nodes | T1-N | 1 | | Cassandra API | |
| | Install OpsCenter | T1-O | 1 | | Cassandra API | |

```
start.instance: {
        "verification": [
          {
          "name": "Last Instance Started",
          "desc": "Returns recently created instance",
          "type": "string",
          "source": "ec2",
          "operation": "ec2-describe-instances",
          "filters": "image-id=ami-i345dh",
          }
        ]
      },
```

FIG. 2B

TEST ENVIRONMENT

BACKGROUND

With the accelerating adoption of networked service provider environments (e.g., "cloud" computing) around the world, organizations are increasingly seeking ways to identify individuals with demonstrated technical skills and knowledge of the best practices for operating in networked computing environments, including multi-tenant service provider environments. Certifications may be obtained to demonstrate that IT (Information Technology) professionals possess the skills and technical knowledge necessary for designing, deploying, and managing applications on a particular platform or in a particular environment. Earning certifications provides credibility for proven experience working with networked computing technologies, as well as contributes to an IT professional's proficiency with technology and applications based out of such networked computing environments.

In some instances, certifications may be provided through the service provider environment and may be used to certify proficiency with the service provider environment, including services available through the service provider environment, and/or may be used to certify proficiency with third-party technologies. Further, the service provider may provide a "test drive" or isolated test environment for enabling an IT professional to test services and applications within a service provider environment. Such isolated test environments may be provided for education, demonstration and/or evaluation purposes. Such test drives may also be used for certification purposes. Each test drive may include a server or other networked computing resource to launch and explore live enterprise solution stacks from third-party vendors and integrators. Some test drives may offer a step-by-step guided tour of the technologies available through the test drive or may present a structured series of tasks to be completed. Other test drives may be open-ended and allow users to experiment with little to no direction or even feedback on performance.

BRIEF DESCRIPTION OF THE DRAWINGS

FIG. 2B is a table showing an example test definition in accordance with an example of the present technology.

DETAILED DESCRIPTION

A technology for providing a test environment within a service provider environment and for evaluating or validating actions taken within that test environment is described. The test environment may be accessed by a user who performs certain objectives within the environment. Completion of the objectives and any related metrics, states, or outputs may be recorded (e.g., in a test environment state log or output log). These recorded metrics, states, or outputs may be evaluated or validated to determine whether the objectives were met by the user. In one example, a method may include defining a macro task for an unstructured lab in a test environment of a service provider environment. The macro task may include a task definition and expected output and/or completion values for a plurality of sub-tasks within the macro task. A request to participate in the unstructured lab may be received from a client device and the macro task may be provided to the client device in response to the request. Metrics may be collected from the unstructured lab using a metrics collector. Completion of the macro task may be analyzed by comparing the metrics to the expected values and a report indicative of performance of the macro task may be provided.

In a more detailed example, a method for providing a test environment may include providing an unstructured lab related to service provider environment resource management, such as including tasks related to setup, operation, maintenance of the service provider environment resources or services. The method may include defining a macro task for the unstructured lab which may include or define multiple sub-tasks. Each of the sub-tasks may have an expected value output or end state. The macro and/or sub-tasks may be defined as tuples stored in a task definition, and the tuples may include one or more tuples representing: identification of the task, defining how the task is to be measured (e.g., which API calls to test for the completion of the task), an expected value for the task measurement or a score for completion of the task. The method may include receiving input from the client device related to completion of the macro task in the service provider environment, such as, for example, attaching network storage to a compute instance, creating a database, etc. The method may include collecting metrics from the unstructured lab using a metrics collector as part of a monitoring service. A comparison of the metrics to the expected values of the sub-tasks (as represented by the tuples) may be performed and the performance of the macro task or the sub-tasks may be scored based on the comparison of the metrics to the expected values. A report of the scored performance may then be provided to the client device, test environment provider, and/or the lab provider. The report may include an overall score or grade, and may further indicate a score or grade for individual of the sub-tasks for the user to identify areas of weakness.

Figure 1A:
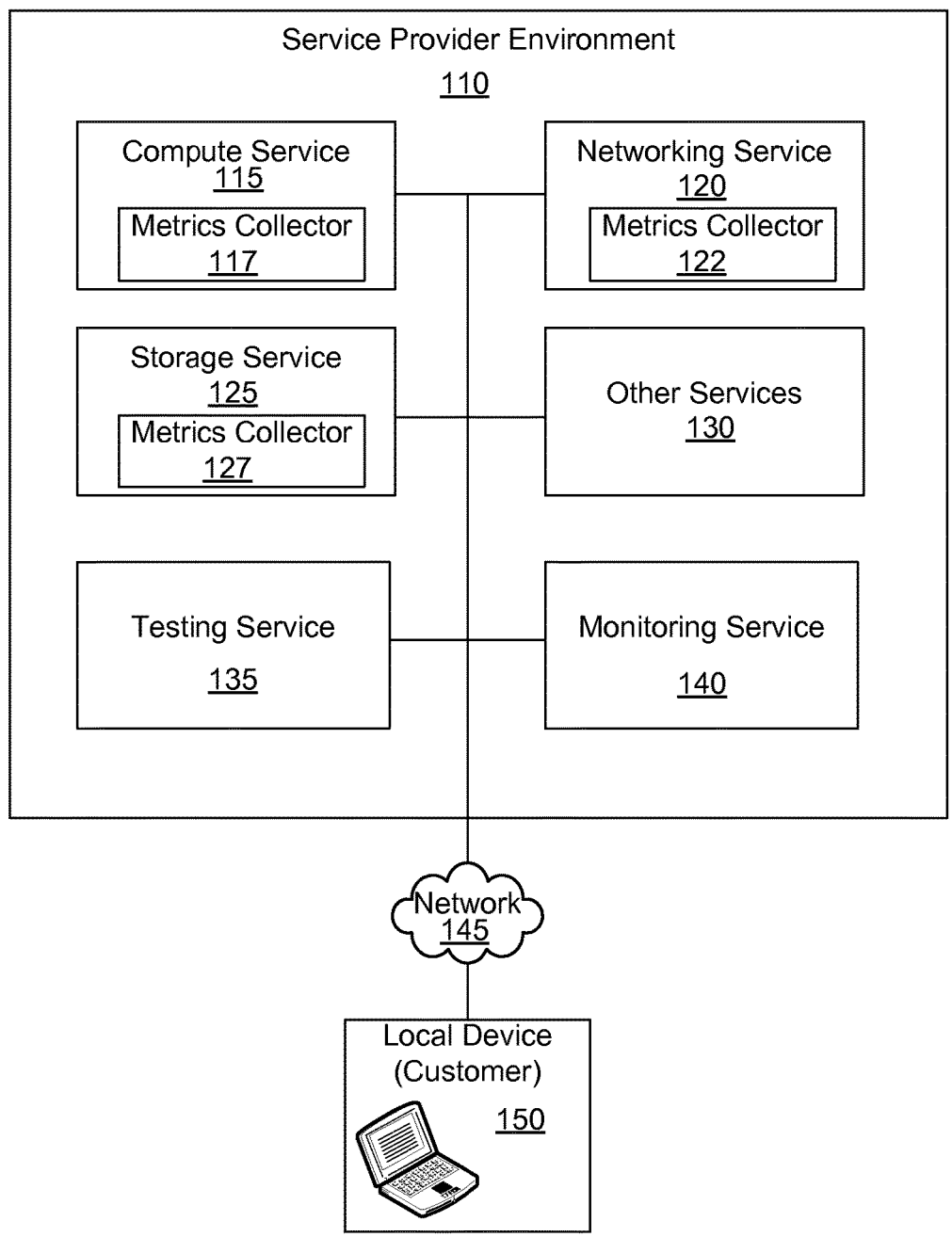
FIG. 1A is a block diagram of a service provider environment for providing unstructured labs in accordance with an example of the present technology.

FIG. 1A illustrates a block diagram of an example implementation of a system for providing a testing environment in a service provider environment 110 in accordance with an example of the present technology. The system may be configured to provide an unstructured lab to a client device (i.e., local device 150) in response to a request to participate in the unstructured lab. The unstructured lab may be provided as the testing environment.

Training or testing labs have followed rigid patterns in the past. These labs may be rigid in form and present a structured series of tasks, such as a learning module that a user or customer "clicks" through page to page. Another pattern for these labs is open-ended, allowing the user to work for a period of time with little to no verification of the user's progress. Using the example of test driving software for education, demonstration, evaluation or other purposes, as described previously, a lab provider may establish a lab that allows users of the lab provider to start up a software offering in a service provider environment and try or test the offering for a few hours. However, this scenario conventionally provides no visibility into what the users are actually doing in the lab or fails to provide the ability to determine if the tasks taken were valuable in a learning process.

The present technology may provide a testing environment with a task defined by the lab provider, including expected results from the lab, where users may test drive the software for education, certification or other purposes, and where feedback or test results may be provided in a fully automated manner through collection of metrics during use of the lab. In one example, the technology may utilize a light weight domain specific language (DSL) and associated service for measuring the success of learning opportunities in unstructured labs. The DSL may be used to create a task definition of a task to be completed by the user.

The testing service 135 may be a consumer of data produced from service provider environment APIs (Application Programming Interfaces) such as a monitoring API or a compute instance API as monitored by the monitored service 140. For example, the DSL may define the learning tasks to be completed during the lab as starting a database, opening a port, attaching storage and/or installing a utility. The testing and monitoring services 135, 140 may then consume the DSL and follow instructions to analyze collected metrics to verify that the database started and to use the compute instance API to determine whether a specified port is open and the storage is attached. The testing and monitoring services 135, 140 may consume the metrics and produce a learning score as output based on comparison of the metrics to expected values defined with the metrics.

The technology may enable the use of a testing environment for certification purposes. For example, if a consultant wants to be registered as an SAP expert, the consultant may have to achieve a learning score of 90% in a lab when working hands-on with SAP HANA, SAP All-in-One, and SAP Business Suite in the testing environment.

The tests may be provided by task definitions defining tasks to be completed in the test. A task definition may be, for example, a simple JSON (JavaScript Object Notation) document structure that contains the tuples of: API Name, API Call, and Expected Values. In addition to having linear tuples in the document, the test definition may also specify nested tuples with AND/OR conditions to specify an order of operation of tasks to be performed, as will be described in additional detail later.

The lab provider may interact with the testing service 135 at creation time to register and associate the test lab environment with the JSON document containing the test definition. When a user registers for the lab and the lab is provisioned into the user account, an API may be called to start a testing service. The testing service 135 may read the test definition to determine what metrics to analyze. Because the lab may be initiated and completed through the test environment, the test environment may initiate the testing service 135 and metrics collection via the monitoring service 140 automatically upon instantiation of the lab. Upon completion of the lab, the testing service 135 may be called to determine the results of the verification efforts. In other words, the testing service 135 may compare metrics collected by the metrics collectors 117, 122, 127 for the monitoring service 140 to expected results defined in the test definition to determine the success of the user in completing one or more tasks defined for the lab in the test definition.

The system may gather metrics from any of a variety of services or computing resources 115, 120, 125, 130 available in the service provider environment 110, such as by using metrics collectors 117, 122, 127 or 140 which may optionally be provided at each of the computer resources 115, 120, 125. The local device 150, or an application executing thereon, may have access to or be associated with the service provider environment 110 for providing network-based services or computing resources. These computing services provide access to a hardware substrate that is underlying the computing resources. FIG. 1A illustrates some example networked computing services, such as a compute service 115, a storage service 125 and a networking service 120. For example, a computing instance may be executing on a hypervisor, which in turn executes on a hardware substrate that may be server hardware. The service provider environment 110 may provide other services 130 as well, such as a data warehouse service, a relational database service or any of a variety of other services. Metrics may be collected from any of the services internally using a metrics collector or externally using the monitoring service, and any suitable combination of external and internal metrics collection may be implemented to collect desired metrics from available services.

As used herein "virtual computing" may refer to the use of computing services (hardware and/or software) which may be available at a remote location from the users of the computing services and the virtual computing services may be accessible over a network 145, such as the Internet. Users may be able to buy these computing services (including storage, computing power, networking and applications) as a utility on demand and sometimes by the hour. Use of virtual computing services can provide a number of advantages including cost advantages and/or the ability to adapt rapidly to changing computing service needs.

The service provider environment 110 may be a multi-tenant service provider environment, such as a "cloud" environment for example. The service provider environment 110 may include an execution environment or a computing instance that includes an application software stack for the user's program or application together with one or more infrastructure services for executing the user's program on the compute service 115. The computing instance in the service provider environment may include a user-selectable operating system (e.g., Linux, Windows, etc.), application server (e.g., Apache Tomcat), system or application configuration, etc. The service provider environment 110 can be configured to be accessed at specific URLs. The infrastructure services can include, but are not limited to, a load balancer to distribute workload across the requested computing services, a load scaler to scale computing services in response to load or demand variations, a firewall or other service to control access to the computing services, a monitoring interface that permits the user to monitor execution of applications, data storage resources (e.g., scalable volume block storage), and so forth. In some embodiments, the user may be able to select one or more services that may be accessed in the service provider infrastructure. For example, the user may be able to select from a plurality of database models (e.g., a relational database, SQL database, NoSQL database, Oracle database, etc.). In some embodiments, the services can be customized to the user rather than being a shared resource among a plurality of users. For example, in some such embodiments, the load balancer can be individually customized to the user's application rather than being shared or distributed among a number of users of the computing service provider.

The service provider environment 110 may be capable of delivery of computing and storage capacity, as well as other computing services, as a service to a community of end recipients. In an example implementation, the service provider environment 110 may be established for an organization or lab provider to provide testing to users at local devices 150. That is, the lab provider may offer a "virtual private cloud environment."

In one example, a service provider environment 110 may include any number of server computers for a compute service 115. The server computers may provide computing services for executing software or computing instances, which may also be referred to as virtual machines. A virtual machine may generally be an instance of a software implementation of a machine (i.e. a computer) that executes computer code like a physical machine.

Software on the computing instances may be an application or a computer program, such as may be designed to perform an activity. An application may manipulate text, numbers, graphics, etc. Some application packages offer focused computing functions by focusing on a single task, such as a web server. Other application packages, such as integrated software packages, may offer less focus but may include multiple applications to perform multiple tasks. User-written software applications tailor systems to meet a user's specific needs. User-written software may include custom numerical processing, internet services, database servers, scientific simulations, graphics rendering and animation processes, email filters and so forth. Applications executable on the computing instance and in the service provider environment may be any suitable type or form or application as may be appreciated.

The computing services in the service provider environment 110 may be monitored using monitoring agents or metrics collectors 117, 122, 127 to measure and/or collect metrics related to the computing services 115, 120, 125 in the service provider environment 110. Metrics data may be collected for the various computing services that have been allocated for a user. Metrics data of the computing services may be analyzed, trended, reported, etc. to monitor the usage patterns and functioning of the computer resources. Metrics data may be collected by a metrics collector, monitoring agent or monitoring service 140, for example. The metrics collectors may take any of a variety of configurations. For example, a metrics collector may be a daemon or instrumentation or the like operating within a computing service 115, 120, 125 and/or may be the monitoring service 140 which may be external to the computing service 115, 120, 125 and may collect data passively, through API calls or through other methods available to monitoring services external to the computing services. Operational performance, resource utilization, demand patterns, etc. of the computer resources may be measured. In some implementations, the metrics data may be tagged as set forth in the test definition. The monitoring service 140 may add key/value pairs to the metrics data so that the tagged metrics data may later be processed. The tagged metrics data may be output to a user or application.

As used herein, the term "measurement" may indicate an observed value with a set of attributes. For example, a measurement may include a name, a set of dimensions, a namespace, a unit, and/or a timestamp among possibly other (or fewer) characteristics. As used herein, the term "dimension" may be used to specify how a measurement can be aggregated, such as by InstanceID, InstanceType, Availability Zone, or other factors (described in detail below). As used herein, a namespace may identify the service that collected the measurement. Furthermore, as used herein, a metric may include an aggregation of measurements data.

The lab provider may specify one or more metrics that define how the various measurements are to be aggregated. For instance, metrics data may include the same attributes as the measurements data and may be the aggregate of some or all measurements with a given name, within a given period of time. As another example, a metric may include an aggregation of some or all of the measurements in a particular namespace, or another metric can include an aggregation of some or all measurements having a particular InstanceID, etc. A metric may, in some embodiments, be an aggregation of other metrics. As a result of this flexibility, in certain embodiments, metrics may include a variety of dimensions based on the preferences of the user.

FIG. 1A further illustrates a monitoring service 140. The monitoring service 140 may be part of the service provider environment 110. The monitoring service 140 may receive the metrics collected by the metrics collectors 117, 122, 127 in the service provider environment 110. The monitoring service 140 may provide monitoring for networked computing services and the applications users run that are associated with the test environment or lab environment.

As used herein a "local" or client device 150 may refer to a device that is local to a user, developer or user or is on the user's network or virtual local network (VLAN), or otherwise independent of and/or separate and distinct from services or devices provided through the service provider environment 110. Developers and system administrators may use the monitoring service 140 to collect and track metrics, gain insight, and so forth with respect to usage of the lab and performance of the users within the lab. The monitoring service 140 may monitor the computing services, such as the compute service, the storage service, and the networking service, and may also monitor custom metrics generated by a user's applications and services. The monitoring service 140 may further monitor the local device 150 and/or any custom metrics generated by an application or service executing on the local device 150. The monitoring service 140 may provide visibility into resource utilization, application performance, and operational health for the test environment or lab environment.

The monitoring service 140 may provide a reliable, scalable, and flexible monitoring solution that may be readily implemented and used for testing environments. Lab providers may avoid the hassle of setting up, managing, or scaling their own monitoring systems and infrastructure. Using the monitoring service 140, lab providers may monitor as much or as little metric data as desired. The monitoring service 140 may enable lab providers to programmatically retrieve monitoring data, view graphs, and set alarms to assist in troubleshooting, spotting trends, and taking automated action based on the performance of users in the test environment.

Figure 1B:
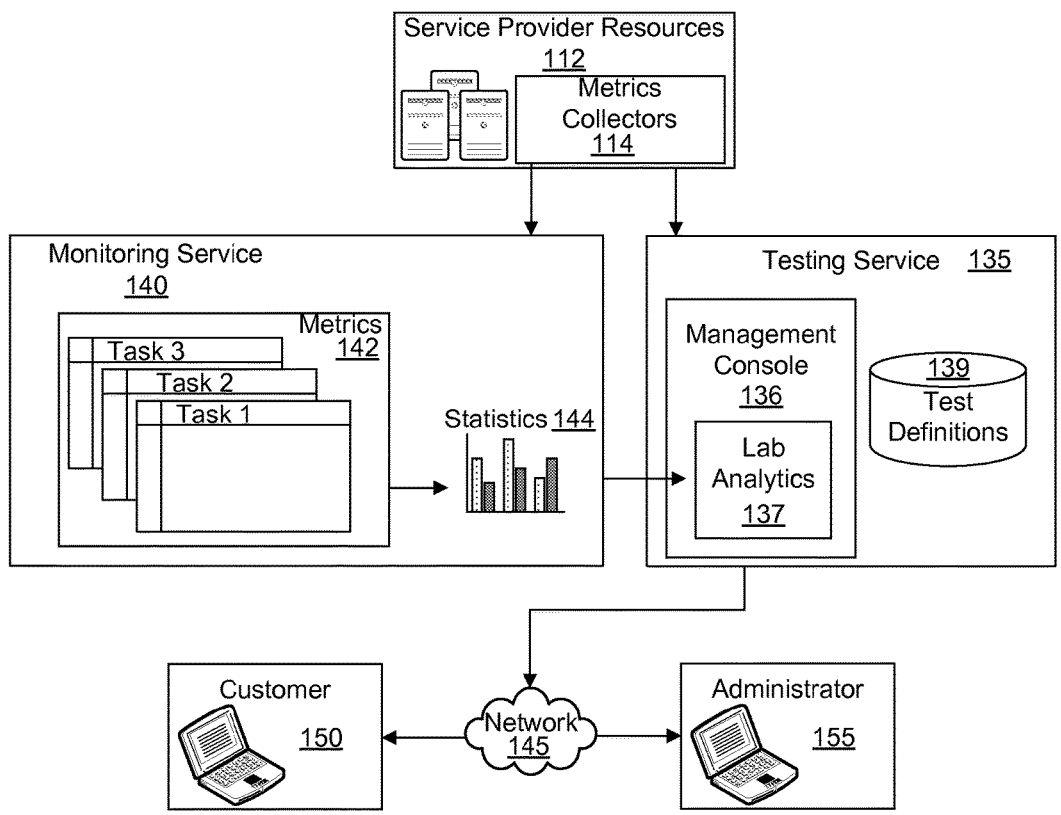
FIG. 1B is a block diagram of a system, illustrating example components of a monitoring service and a testing service in accordance with an example of the present technology.

Reference will now be made to FIG. 1B. As discussed with respect to FIG. 1A, computing resources in a service provider environment (i.e., service provider services or resources 112 or simply "services") may be monitored and metrics may be collected by a metrics collector 114 and sent to a monitoring service 140. The monitoring service 140 may enable monitoring of service provider environment resources 112 as events occur, including, for example, the monitoring of: computing instances, storage volumes, elastic load balancers, relational database service database instances and so forth. Metrics 142 related to task completion in a test environment, such as attachment of network storage, creation of a database, population of the database, opening of a port, etc., may be collected automatically. Lab providers may further supply definitions for custom application and system metrics which may be monitored in the monitoring service. The monitoring service 140 may provide statistics 144, graphs, and other aspects of the metric data. The monitoring service 140 functionality may be accessible by an administrator (e.g., the lab provider) via API, command-line tools, an SDK (software development kit), and/or a management console 136.

The service provider resources 112 may be monitored using metrics collectors 114, and default or predefined metrics may be collected for a test environment. In addition, the lab provider may submit definitions for custom metrics generated by specific applications (or by other resources not mentioned above) and have these custom metrics monitored in the monitoring service 140.

The management console 136 may be used by the administrator to view statistics for the collected metrics or to view analyzed results for a completed test environment. The monitoring service 140 may provide an alarm service to send notifications or automatically make changes (such as scaling of service provider resources) to the resources being monitored based on rules that are defined by the lab provider.

The monitoring service 140 may include a metrics repository or data store from which administrators 155 or the testing service may retrieve statistics 144 based on those metrics 142. The metrics 142 may be used to calculate statistics 144 and present the data graphically in the management console 136. The management console 136 may enable an administrator 155 to view graphs and statistics for any of the collected metrics and view a quick overview of alarms and monitored resources in one location. Once metrics 142 are uploaded to the monitoring service 140, the metrics 142 may be visualized in the management console 136.

The management console 136 may provide machine analysis or lab analytics 137 of statistics 144 and/or metrics 142 received from the monitoring service 140. For example, business rules, scripts and the like may be used to analyze the statistics 144, or rather to compare the statistics or metrics 142 to expected values defined in the test definition.

Unstructured labs provided using the testing service in the service provider environment enable lab providers to build implementations of software offerings for users to test and see the software in action, as well as to demonstrate competence or proficiency with the software. For example, the user may download a sample of the SAP HANA database. The user may be able to start the database, see the data in the database, view the dashboards available with the database, and explore the various capabilities provided with the database. Labs may supply lab providers with an opportunity to demonstrate various capabilities of the lab provider's software offerings. (The lab provider may be a third-party to the service provider providing the service provider environment). The labs according to the present technology may provide a feedback loop for users to test drive the software, training for users and recording of progress for the training for the individual users.

In contrast to conventional computer-based training or testing, which is generally structured with step-by-step instructions of how to proceed, the labs of the present technology may be unstructured and be able to provide meaningful analysis of performance of the test for data centers or other networked computing environments. In practice, many individuals may perform actions to complete a task in a different manner or order other than how a testing environment may structure such actions. Thus, the present technology may be a canvas for users to experiment and build on. The test definitions may specify types of interactions expected that the users may go through as progressing through the lab. Even if the expected actions are not in any defined order, the present technology can validate those actions, if performed correctly.

The user may be provided with a task upon initiation of the lab. The task may be predefined by the lab provider. The testing service 135 may include or be in communication with a test definitions data store 139 for storing the test definitions provided by the lab provider. The monitoring service 140 may record the activities and actions of the user within the lab. For example, tasks may include starting a database, opening a port, attaching a storage subsystem, installing a utility, running a dashboard, etc. Each of these tasks may be associated with verifiable metrics that may be collected during or upon completion of the task. The test definitions 139 may specify the criteria that is being tested against and the testing service may compare the criteria with metrics coming out of a computing instance that is running in the service provider environment. The monitoring service 140 may provide log files, API calls and other information that may be used to see what is going on as the user is using the computing instance. The management console 136 may identify the tasks in the test definition that the user is expected to complete and compare the tasks with logs, API calls, etc. to identify how well the user performed. The management console may then notify the user and/or the administrator of the performance of the task(s).

In one example, the test definition may be a DSL in the form of a JSON document including tuples of API names, API calls and expected values for each of the interactions expected from the user. Some example tasks include starting a compute instance, attaching network storage, assigning a drive to the network storage, and formatting the storage. A compute instance API may be used to see if the storage is attached properly. An operating system call may be used to see if the drive mount has been assigned a drive letter. The file system may be accessed (or attempted to be accessed) to see if the file system has been formatted. The value of the various metrics may be recorded to a persistent storage. The results may be scored by comparing the metrics to expected values.

In some examples, the system may be unable to directly access the operating system or applications within a lab's compute instance to record values pertaining to the operating system. However, a daemon may be embedded in the operating system to collect the operating system metrics and report the metrics to the monitoring service. Various combinations of metrics or metrics collectors may be used to verify completion of tasks, such as verifying a combination of identifying API calls and operating system calls. The daemon may be a computer program that runs as a background process, rather than being under the direct control of the user using the test environment. The daemon may be started at a boot time of an operating system on a compute instance and may report various activities, such as related to application usage, network requests, hardware activity, or other tasks.

It should be appreciated that although certain implementations disclosed herein are described in the context of computing instances or virtual machines, other types of computing configurations can be utilized with the concepts and technologies disclosed herein. For instance, the technologies disclosed herein can be utilized directly with physical hardware storage resources or virtual storage resources, hardware data communications (i.e., networking) resources, I/O hardware and with other types of computing resources.

The term "data store" used herein may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media.

Services provided through the service provider environment may represent one or more processes executing on a server or other computer hardware. Such services may be centrally hosted functionality or a service application that may receive requests and provide output to other services or devices. For example, services may be considered on-demand computing that is hosted in a server, virtualized environment, grid or cluster computing system.

Figure 2A:
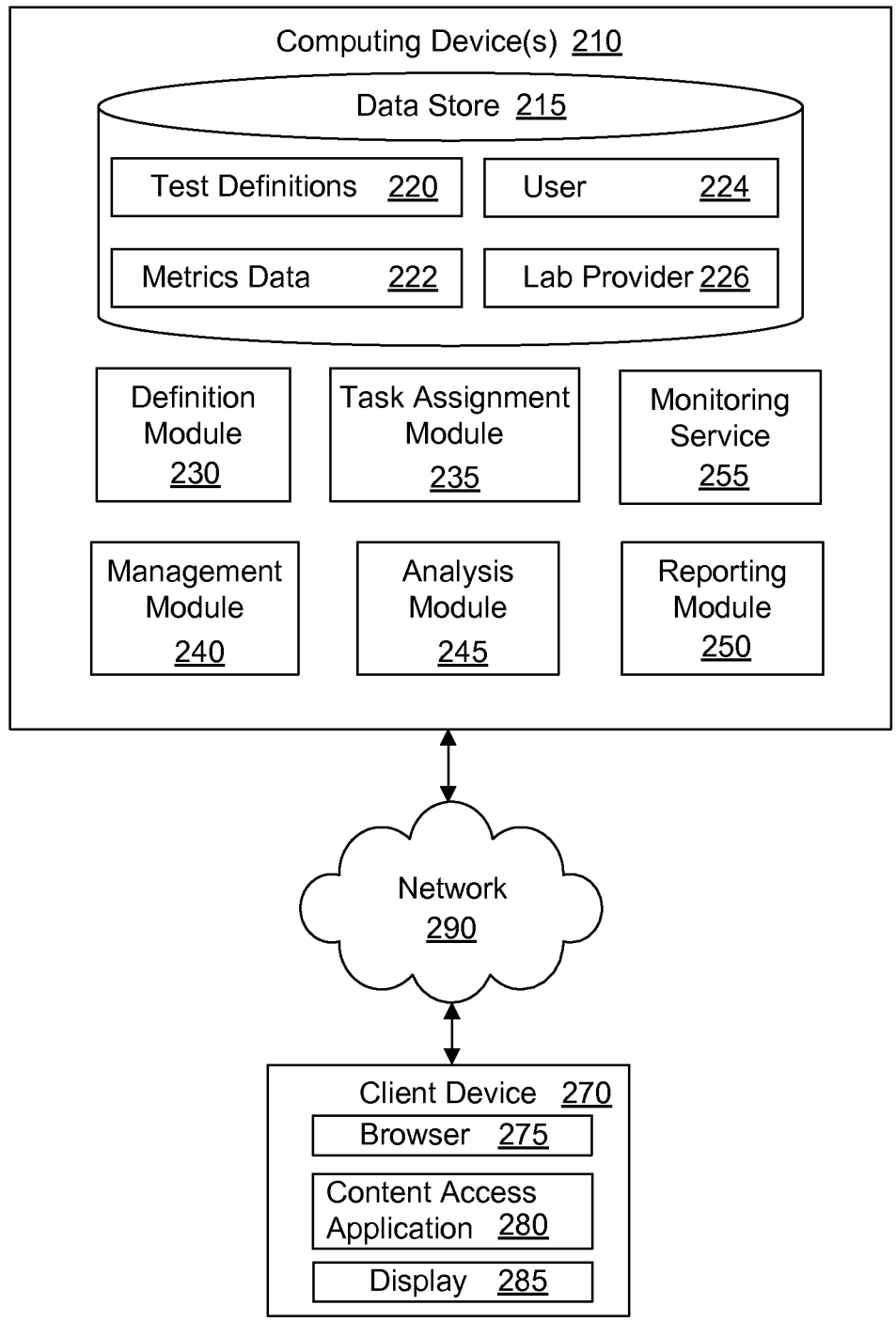
FIG. 2A is a block diagram of a system for providing a test environment in accordance with an example of the present technology.

Referring now to FIG. 2A, a block diagram of a system for providing a test environment is illustrated in accordance with an example of the present technology. The system may be implemented using one or more computing devices 210, such as a server for example, as well as client devices 270, and may be implemented using or across a network 290. The system may include a data store 215 and a number of modules 230, 235, 240, 245, 250 for storing and processing data to be used in providing the lab to the client device 270.

The system may utilize instrumentation to monitor completion of the training or testing in the lab. The instrumentation may enable the system to "sense" when the user ends the lab and/or has successfully accomplished the task. The instrumentation or collection of metrics enables determination by a computer whether the user has completed the tasks and provides the results of the user's performance through the logging and metrics infrastructure. In other words, the system may grade performance of the user through comparison of expected values with actual values returned from logging, APIs and other infrastructure. In one example, the instrumentation may include additional function calls that report every time a function or "line of code" is executed.

The system may further be configured to report back to the user or the lab provider with specificity regarding what the user did right and/or wrong. The metrics may enable identification of how far the user progressed through the test because the answers to the test are the use of the system, and the infrastructure shows whether the system was used properly.

Computing services offered by a service provider environment, may include a computing device that executes as one or more servers or computing instances. A user may operate one or more servers to execute an operating system and computing applications as a service. A user may create, launch, and terminate servers as desired. The creator of the lab may have some control over the geographical location of servers or clusters of servers to optimize latency and provide high levels of redundancy.

The user may access and manage the one or more servers over a network 290 connection, such as a connection through the Internet, for example. The user may perform various operations on the servers such as adding, updating, modifying, deleting or other otherwise maintaining software on the servers. These operations may be performed by the user from the client device 270.

The server(s) or computing device(s) 210 may be a computing instance as previously explained, and the virtual computing instance may be implemented using a service provider environment in a service provider environment, which may include a virtual distributed computing system with a virtualization layer executing on a hardware substrate layer. The hardware layer may include a plurality of physical computers, servers or processing nodes. The virtualization layer (e.g., hypervisor) may provide a platform on which virtual computing instances may be created. In other words, the virtual computing instances may execute on the hardware layer by using the platform provided by the virtualization layer. This computing service architecture that supports computing instances is illustrated in more detail later.

The system may include a definition module 230 by which a lab provider may define a test, including the definition of one or more tasks, such as macro and/or sub-tasks. As used herein, a macro task may refer to an overarching goal to be completed that may include multiple sub-tasks or "micro tasks" in the completion of the macro task. The lab provider may define the macro and sub-tasks, such as by defining tuples containing the task name, metric to monitor for the task, and the expected metric value. An example test definition is provided in FIG. 2B.

As may be appreciated from FIG. 2B, the task definition includes a macro task for installing a Cassandra cluster node. The task definition further includes a list of micro or sub-tasks that are expected to be performed in completing the macro task. Each of the tasks may include a task identifier (i.e., ID), a score, and a method of verification. Different tasks may have different scores. A sum of the scores for the sub-tasks may total the score value for the macro task. In some instances, the score may be assigned by the analysis module based on an absolute determination of whether a task has been completed. In other instances, the score may be assigned based on partial completion of the task or based on other factors such as whether the completion of the task complied with best practices for completion of the task. The example task definition provided above does not specifically define expected values. In some instances, the sub-tasks may be scored based on the absolute determination of completion of the sub-tasks where values other than 'yes' or 'no', 'true' or 'false', '1' or '0' are not returned. For the test environment, each of the values may be assumed to be 'no', 'false', '0', or the like until the metrics collected indicate otherwise. Tasks identified in the test definition with a returned metric value of 'yes', 'true', etc. may thus be identified as completed and be scored accordingly.

With continued reference to FIG. 2A, the definition module 230 may enable the lab provider to specify subtasks within the tasks, sub-sub-tasks within sub-tasks, and so forth. For example, a task of starting a database may have multiple components or sub-tasks, such as creating database in relational database service, adding a database security group, mapping the security group to a compute instance, creating tables within the database, moving data into the table from another database, etc. The definition module 230 enables lab providers to specify each subtask for each task and how the tasks/sub-tasks are going to be measured. Using the current example of starting the database, completion of the task could be measured by performing an API call to see if database exists. On a finer level of granularity, the system could determine whether security groups are present, whether the correct tables have been created, whether the database is accessible from the compute instance, whether the database includes a correct number of records in the table and so forth.

The metrics may be collected using a monitoring service 255, using a daemon or using any other suitable sources or metrics collectors. One or more metrics collectors may be used in any suitable combination to gather the metrics suitable for determining whether a task has been completed. As demonstrated in the sample test definition above, the test definition may include identification of the source of metrics data.

The definition module 230 may enable tests to be defined with a variety of levels of complexity. Some tests may be defined to be completed linearly, such as using nested tuples or dependencies. For example, a user may be unable to complete a sub-task of formatting storage prior to attaching the storage and thus attaching the storage may be a prerequisite for formatting. Some tests may be defined to be completed in parallel, where an order of completion of the different components is not specified. For example, a task may be to create an elastic IP (internet protocol) address and attach the address to a compute instance. If this task is completed at any point it time, regardless of completion relative to other tasks, then the completion may count for the test and receive a full score. In some examples, an output of one operation or task may be the input of another.

The definition module 230 may enable the lab provider to define how, where, and/or how often metrics are to be collected. For example, the definition module may define that the monitoring service is to take input from the JSON document to identify where to gather the metrics at 30 second intervals. The test service may store test definitions 220 as templates that are modifiable by the lab providers. For example, while a test definition template may define a collection interval of 15 seconds, the lab provider may modify the interval to 20 seconds.

The system may include a task assignment module 235. The task assignment module 235 may assign the task or tasks to the user. The task assignment module 235 may provide the macro task to the user without also enumerating the sub-tasks involved in completing the macro task. Omission of the sub-tasks from the instruction may further facilitate the unstructured and open learning environment. The user may be expected to know or identify the sub-tasks that are expected to be completed in order to complete the macro task, such as through training completed independently and prior to the lab. Each task may have a definition and a way of proving that the task has been completed, such as the API call, OS operation, etc. The task assignment module 235 may assign a time period within which the macro task is to be completed. The lab may terminate at the termination of the time period and the analysis module may evaluate the collected metrics against the test definition and score the test. The task assignment module 235 may further provide the user with an opportunity to retake the test if desired.

The analysis module 245 may evaluate the metrics and logs. When a test is successfully completed, then the analysis module 245 may examine what happened in the logs and other data, such as by looking for specific items in the logs to know that the test was successful. Test performance data may be persistent and thus may be evaluated at a conclusion of the lab. Alternatively, the analysis module 245 may analyze completion of the various tasks at predetermined intervals, such as every 15 seconds. Evaluation at intervals may be useful in identifying where users initially did something wrong but later fixed the issue. The analysis module 245 may take the JSON document defining tasks and steps, along with expected outputs or output parameters, as an input, along with metrics. An output of the analysis module 245 may be recorded, for example, to a noSQL database where results tallied up and scored. This database may be included in a user data store 224 for storing user data such as profile information, account information, lab scores and so forth.

A reporting module 250 may be used to provide results of the analysis module 245, as well as any other additional feedback, to the user or the lab provider. The reporting module 250 may optionally report mistakes that were made and/or correct solutions to the lab. The system may include a management module 240 for managing the services or service provider resources for the user during the lab. The management module 240 may also provide an interface through which the lab provider may modify the lab, check user lab results and so forth.

The system may include one or more data stores 215. The data store 215 may include or be configured to store any of a variety of useful types and formats of data. For example, the data store 215 may include a test definitions data store 220 for storing the test definitions as has been described. The data store 215 may also include a metrics data store 222 for storing collected metrics to be compared against expected values in the test definitions. The data store may further include a user data store 224 and a lab provider data store 226 for storing profile or account information, lab completion information and so forth.

Client devices 270 may access data, content pages, services and so forth via the computing device 210, which may represent a computing instance or server in a computing service provider environment or one or more computing instances or clusters, over a network 290. Example client devices 270 may include, but are not limited to, a desktop computer, a laptop, a tablet, a mobile device, a television, a cell phone, a smart phone, a hand held messaging device, a personal data assistant, an electronic book reader, heads up display (HUD) glasses or any device with a display 285 that may receive and present the message content.

The system may be implemented across one or more computing device(s) 210, 270 connected via a network 290. For example, a computing device 210 may include a data store and various engines and/or modules such as those described above and such modules may be executable by a processor of the computing device. The system may be implemented as a plurality of computing nodes or computing instances, each of which comprises at least one processor and a memory, where the computing nodes are configured to collectively implement the modules, data stores and so forth.

The modules that have been described may be stored on, accessed by, accessed through, or executed by a computing device. The computing device may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the computing device according to various implementations, which applications and/or functionality may be represented at least in part by the modules that have been described. Also, various data may be stored in a data store that is accessible to the computing device 210 but which may be otherwise independent of the computing device 210. The data store may be representative of a plurality of data stores as may be appreciated. The data stored in the data store, for example, may be associated with the operation of the various modules, applications and/or functional entities described. The components executed on the computing device may include the modules described, as well as various other applications, services, processes, systems, engines or functionality not discussed in detail herein.

The client device shown in FIG. 2A may be representative of a plurality of client devices 270 that may be coupled to the network 290. The client device(s) 270 may communicate with the computing device over any appropriate network, including an intranet, the Internet, a cellular network, a local area network (LAN), a wide area network (WAN), a wireless data network or a similar network or combination of networks.

The client device 270 may include a display 285. The display 285 may comprise, for example, one or more devices such as cathode ray tubes (CRTs), liquid crystal display (LCD) screens, gas plasma based flat panel displays, LCD projectors, or other types of display devices, etc.

The client device 270 may be configured to execute various applications such as a browser 275, a respective page or content access application 280 for an electronic retail store and/or other applications. The browser 275 may be executed in a client device 270, for example, to access and render content pages, such as web pages or other network content served up by the computing device 210 and/or other servers. The content access application 280 may be executed to obtain and render for display content features from the server or computing device, or other services and/or local storage media.

In some implementations, the content access application 280 may correspond to code that is executed in the browser 275 or plug-ins to the browser 275. In other implementations, the content access application 280 may correspond to a standalone application, such as a mobile application. The client device may be configured to execute applications beyond those mentioned above, such as, for example, mobile applications, email applications, instant message applications and/or other applications. Users at client devices 270 may access content features through content display devices or through content access applications 280 executed in the client devices 270.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or user devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

Various implementations of the present technology may be used in environments other than the user support examples provided above. For example, some implementations may be used for instructional purposes, such as a classroom or online learning environment. A student may utilize a support application with similar functionality as the user support application described above, for connecting and re-connecting with other students, faculty and so forth. Other implementations of the present technology may be utilized in any other context in which one or more user computing devices or communication devices communicate with one or more support computing devices or communication devices via one or more one-way or two-way communication channels.

Figure 3:
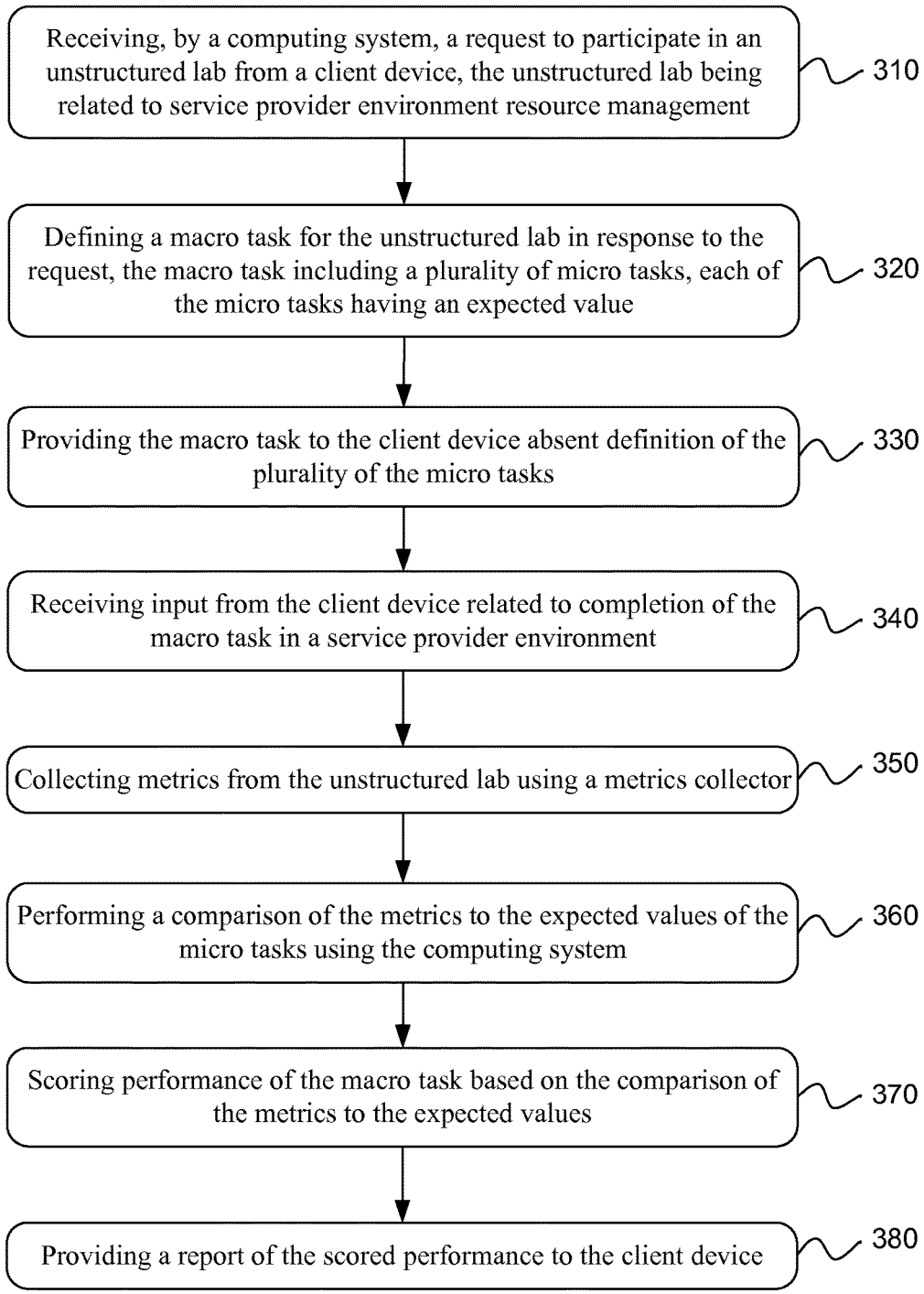
FIGS. 3-4 are flow diagrams for methods of providing test environments in accordance with examples of the present technology.
Figure 4:
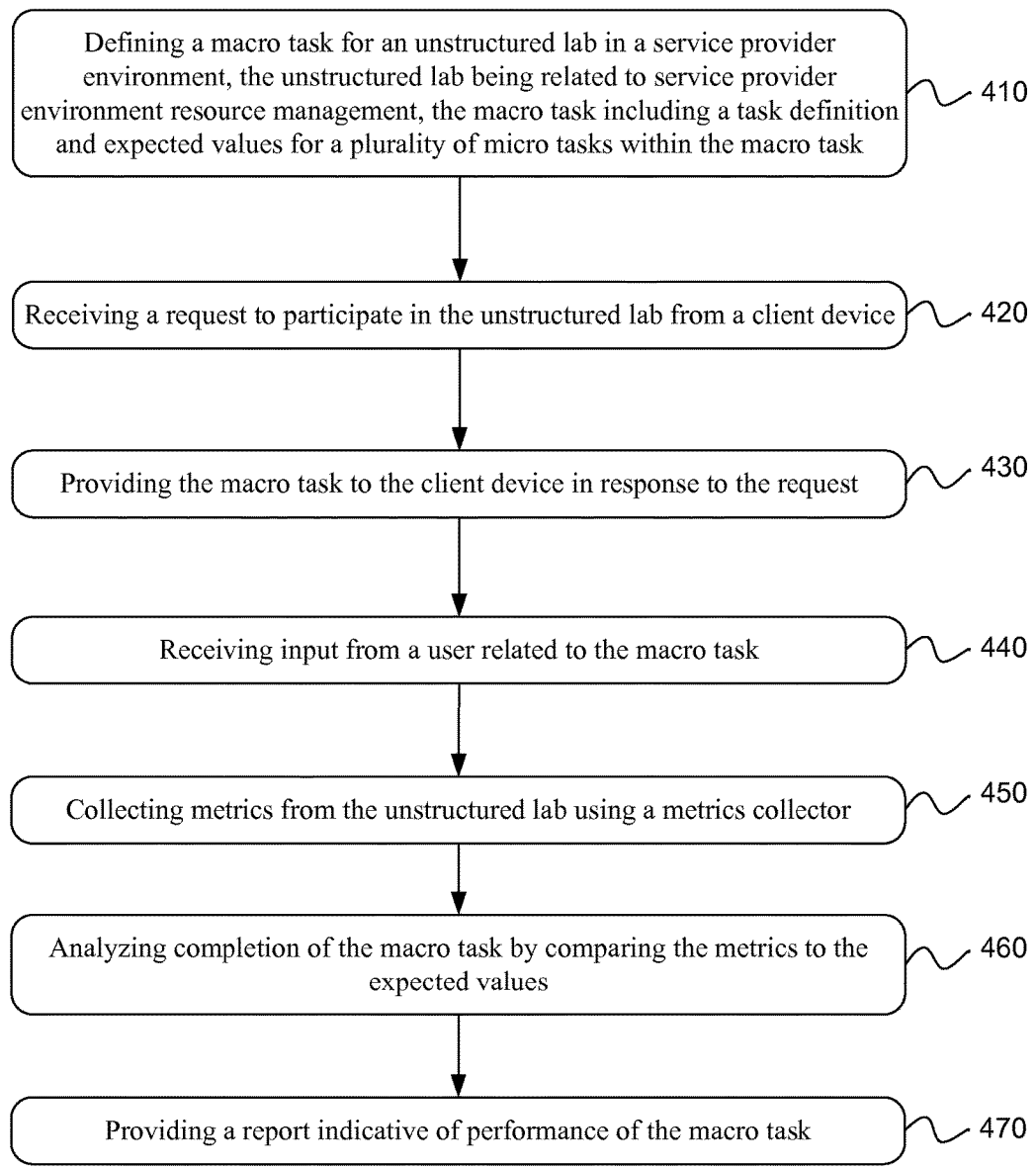

FIGS. 3-4 illustrate flow diagrams of methods according to the present technology. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Additional example details, operations, options, variations, etc. that may be part of the method have been described previously herein and/or are described in further detail below. Various systems, devices, components, modules and so forth for implementing the method may also be used, as described with respect to the various examples included in this disclosure.

Referring now to FIG. 3, a flow diagram of a method for providing a test environment is illustrated in accordance with an example of the present technology. The method may include receiving 310 a request to participate in an unstructured lab from a client device. The client device may be a user client device connected to a service provider environment over a network such as the internet. The unstructured lab may be related to service provider environment resource management or use, such as including tasks related to setup, operation, maintenance and the like of the service provider environment resources.

The method may include defining 320 a macro task for the unstructured lab in response to the request received. The macro task may include or define a plurality of sub-tasks. Each of the sub-tasks may have an expected output value or values. The macro and/or sub-tasks may be defined as tuples with the tuple elements including: identification of the task, how the task is to be measured (e.g., which API calls to test for the completion of the task), an expected value for the task measurement or a score for completion of the task. The lab or test definition may define an order of completion for some of the sub-tasks and/or the order of completion for at least some of the sub-tasks may be unrestricted.

The method may include providing 330 the macro task to the client device upon request. In one example, the method may include forwarding the request to participate in the unstructured lab to the lab provider for approval to participate in the lab or forwarding the macro task within the lab to the client device. When providing the macro task to the client device, the macro task may be provided absent any definitions for sub-tasks—in other words, the lab may be unstructured, as has been described.

The method may include receiving 340 input from the client device related to completion of the macro task in the service provider environment. In other words, the user may begin to interact with the lab and begin manipulating the lab toward completion of the macro task, such as by attaching network storage to a compute instance, creating a database, etc. The method may include collecting 350 metrics from the unstructured lab using a metrics collector as part of a monitoring service. A comparison of the metrics to the expected values of the sub-tasks may be performed 360 and the performance of the macro task or the sub-tasks may be scored 370 based on the comparison of the metrics to the expected values. A report of the scored performance may then be provided 380 to the client device and/or the lab provider. The report may include an overall score or grade, and the report may further indicate a score or grade for individual sub-tasks for the user to identify areas of weakness. The score may be indicative of the completion of the sub-tasks. The report may optionally include suggestions for improvement in the areas of weakness.

The method may further include collecting the metrics using a plurality of different types of metrics collectors, such as a metrics collector to monitor API calls, a daemon to monitor activity on an operating system and so forth. The metrics collectors may be suited to monitor for multiple expected values for the sub-tasks. Measurement for different sub-tasks may be performed differently, and different types of metrics collectors may be selected for these different measurements.

The unstructured lab may be unstructured or free form, but with guidelines in the form of the definition for grading the lab. The lab service space may be integrated with other service provider services. The lab may be defined by a DSL that is declarative and lets lab providers build custom tests or modify test templates provided by the service provider. An example lab objective may be to test or explore a data center or a series of data centers. Various aspects or services of the service provider environment may be tested using the technology described in this document, the services may be services such as compute, storage, networking, database, and other services. The data center may be located in one or more regions. The lab may test knowledge of programming a data center. The lab may be implemented on actual live systems that are not emulated, and which may be the same as production systems but without a production workload or data.

While some examples have been described in terms of a DSL or JSON document, these are examples of input for providing the test environment. Another example may be a GUI (graphical user interface) that collects test parameters from the lab provider who defines the test in a noSQL database. Results of the lab, and/or the collected metrics, may be stored in a noSQL database. The inputs and outputs of the method may be data driven.

When the user initiates the test, the user does not have to tell the system to start evaluating the lab. A test service may alert the monitoring service that the lab is beginning. The monitoring service may begin polling APIs and polling information from the resources created to collect metrics. The lab may be completed without downloading any specific applications to a client device. In one example, software may be launched in a compute instance in the service provider environment within a VPC (virtual private cloud) with an attached elastic block storage (EBS) running in a test account for the lab provider. The system may enable practically any customer or user to register and allow the lab provider to determine whether to issue the lab. If the lab is issued by the lab provider and initiated by the user, the system may begin monitoring the lab.

Referring now to FIG. 4, a flow diagram of a method for implementing a testing environment for providing an unstructured lab is illustrated in accordance with an example of the present technology. The method may include defining 410 a macro task for an unstructured lab in a service provider environment. The definition may be received from a lab provider and may be used at an initiation of the lab to define how the lab is to be monitored. The unstructured lab may relate to service provider environment resource management and/or use. The macro task may include a task definition and expected values for sub-tasks within the macro task. For example, the macro task may identify the sub-tasks and specify the expected values for completion of the sub-tasks. The expected values may be expected metrics that will be monitored during the lab. The method may include receiving 420 a request to participate in the unstructured lab from a client device and providing 430 the macro task to the client device in response to the request. As input is received 440 from a user related to the macro task, metrics may be collected 450 from the unstructured lab. Completion of the macro task may be analyzed 460 by comparing the metrics to the expected values. A report may then be provided 470 which is indicative of performance of the macro task and/or the sub-tasks.

In one example, the task definition may further include tuples of an API name, API call and expected value for one or more of the sub-tasks. The tuples may be linear or nested to specify whether an order of performance of the sub-tasks is significant or whether the sub-tasks may be performed in parallel in any unspecified order. The method may include providing the sub-tasks to the client device for the lab to be open and unstructured, and testing the user's knowledge of the components of the macro task.

The method may include collecting the metrics and analyzing completion of the sub-tasks at set periodic intervals during the unstructured lab. The metrics may be stored in a persistent data store and analyzed at the completion of the macro task based on the metrics stored in the persistent data store. In an alternative implementation, the method may include monitoring completion of the sub-tasks during use of the unstructured lab and analyzing the completion of the sub-tasks during completion of the unstructured lab. In the first example, the metrics may be collected and stored during the lab and graded at the conclusion of the lab. In the second example, the metrics be collected and graded during the lab as the metrics are collected, based on the task definition.

The method may include identifying mistakes in performance of the macro task by identifying where the metrics differ from the expected values. These mistakes may be highlighted in the report. In some examples, the user may receive a partial score for completion of the micro/macro tasks based on how the task was completed. For example, the test definition may further specify best practices for completing the sub-tasks. When the user completes the task using the specified best practices, then a full score may be awarded. When the task is completed with other operations than using the best practices or in variance from the best practices, then a partial score may be awarded. The full score may be a higher score than the partial score. For example, an SAP instance test definition may define that the instance is to have a security group, of any name, and to have port X open. The test definition may further specify that use of a source IP of a Tableau Software instance is valid from a security standpoint, but is not the best practice and receives a half score. The test definition may define a best practice as creating a security group for the Tableau instance for receiving full credit.

An example unstructured lab may be provided to test knowledge of management of a data center including networked computing resources in the service provider environment by testing the performance of the macro task. Certification of data center management may be provided upon successful completion of the test. The test or the lab may be provided and defined by a third party. The unstructured lab may be hosted in a service provider environment. The unstructured lab may be provided to a user registered with the third party and the service provider environment.

Similarly as mentioned in the description of the method illustrated in FIG. 3, additional example details, operations, options, variations, etc. that may be part of the method illustrated in FIG. 4 have been described previously herein and/or are described in further detail below. Various systems, devices, components, modules and so forth for implementing the method may also be used, as described with respect to the various examples included in this disclosure.

Figure 5:
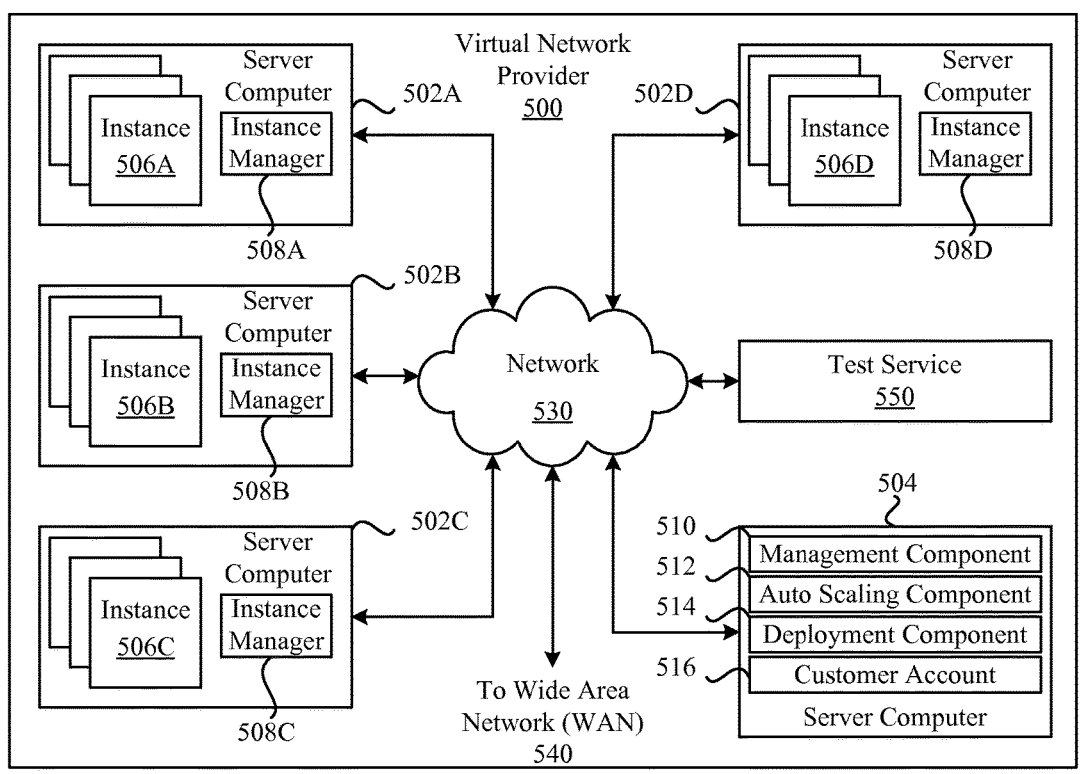
FIG. 5 is a schematic overview of a virtual computing resource provider in accordance with an example of the present technology

FIG. 5 illustrates how components of a data center may function as a computing service 500 in a service provider environment. As discussed earlier, the computing service 500 (i.e., the cloud provider or service provider) may be capable of delivery of computing and storage capacity as a service to a community of end recipients. In an example implementation, the computing service may be established for an organization by or on behalf of the organization. That is, the computing service 500 may offer a "private cloud environment." In another implementation, the computing service 500 may support a multi-tenant environment, wherein a plurality of users operate independently (i.e., a public cloud environment). Generally speaking, the computing service 500 can provide the following models: Infrastructure as a Service ("IaaS"), Platform as a Service ("PaaS"), and/or Software as a Service ("SaaS"). Other models may also be provided. In some implementations, end users access the computing service 500 using networked client devices, such as desktop computers, laptops, tablets, smartphones, etc running web browsers or other lightweight client applications. Those skilled in the art will recognize that the computing service 500 can be described as a "cloud" environment.

The particularly illustrated computing service 500 may include a plurality of server computers 502A-502D. While four server computers are shown, any number may be used, and large centers may include thousands of server computers. The server computers 502A-502D may provide computing resources for executing software instances 506A-506D. In one implementation, the instances 506A-506D may be virtual machines. A virtual machine may be an instance of a software implementation of a machine (i.e. a computer) that executes applications like a physical machine. In the example of virtual machine, each of the servers 502A-502D may be configured to execute an instance manager 508 capable of executing the instances. The instance manager 508 may be a hypervisor or another type of program configured to enable the execution of multiple instances 506 on a single server. Additionally, each of the instances 506 may be configured to execute one or more applications.

It should be appreciated that although the implementations disclosed herein are described primarily in the context of virtual machines, other types of instances can be utilized with the concepts and technologies disclosed herein. For instance, the technologies disclosed herein can be utilized with storage resources, data communications resources, and with other types of computing resources. The implementations disclosed herein might also execute all or a portion of an application directly on a computer system without utilizing virtual machine instances.

One or more server computers 504 may be reserved for executing software components for managing the operation of the server computers 502 and the instances 506. For example, the server computer 504 may execute a management component 510. A user may access the management component 510 to configure various aspects of the operation of the instances 506 purchased by the user (i.e., the administrator of a service to be executed using the instances and made available to traffic from client devices). For example, the user may purchase, rent or lease instances and make changes to the configuration of the instances. The user may also specify settings regarding how the purchased instances are to be scaled in response to demand. An auto scaling component 512 may scale the instances 506 based upon rules defined by the user. In one implementation, the auto scaling component 512 allows a user to specify scale-up policies for use in determining when new instances should be instantiated and scale-down policies for use in determining when existing instances should be terminated. The auto scaling component 512 may consist of a number of subcomponents executing on different server computers 502 or other computing devices. The auto scaling component 512 may monitor available computing resources over an internal management network and modify resources available based on predictions of need as well as based on actual need.

A deployment component 514 may be used to assist users in the deployment of new instances 506 of computing resources. The deployment component 514 may have access to account information associated with the instances, such as who is the owner of the account, credit card information, country of the owner, etc. The deployment component 514 may receive a configuration from a user that includes data describing how new instances 506 should be configured. For example, the configuration may specify one or more applications to be installed in new instances 506, provide scripts and/or other types of code to be executed for configuring new instances 506, provide cache logic specifying how an application cache should be prepared, and other types of information. The deployment component 514 may utilize the user-provided configuration and cache logic to configure, prime, and launch new instances 506. The configuration, cache logic, and other information may be specified by a user using the management component 510 or by providing this information directly to the deployment component 514.

User account information 516 may include any desired information associated with a user of the multi-tenant environment. For example, the user account information can include a unique identifier for a user, a user address, billing information, licensing information, customization parameters for launching instances, scheduling information, auto-scaling parameters, previous IP addresses used to access the account, etc. Information such as the unique identifier, IP addresses used to access the account and so forth may be used in authenticating a user to the service provider environment.

A network 530 may be utilized to interconnect the server computers 502A-502D and the server computer 504, 550. The network 530 may be a local area network (LAN) and may be connected to a Wide Area Network (WAN) 540 so that end users may access the computing service 500. It should be appreciated that the network topology illustrated in FIG. 5 has been simplified and that many more networks and networking devices may be utilized to interconnect the various computing systems disclosed herein.

The computing service 500 or service provider environment may include a test service 550 to allow lab providers to define and provide tests. The test service 550 may further enable users to participate in unstructured labs defined by and provided by the lab providers. The test service may operate according to the descriptions of the test service 550 herein.

Figure 6:
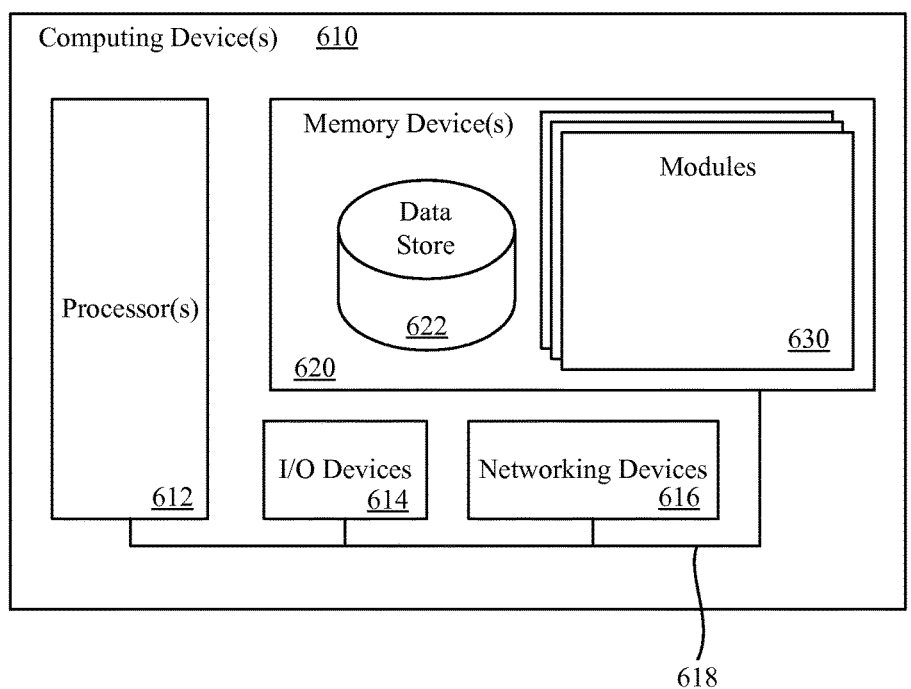
FIG. 6 is a block diagram of a computing system for providing a test environment in accordance with an example of the present technology.

FIG. 6 illustrates a computing device 610 on which services or modules of this technology may execute. A computing device 610 is illustrated on which a high level example of the technology may be executed. The computing device 610 may include one or more processors 612 that are in communication with memory devices 620. The computing device 610 may include a local communication interface 618 for the components in the computing device. For example, the local communication interface 618 may be a local data bus and/or any related address or control busses as may be desired.

The memory device 620 may contain modules 630 that are executable by the processor(s) and data for the modules. A data store 622 may also be located in the memory device 620 for storing data related to the modules and other applications along with an operating system that is executable by the processor(s) 612.

The computing device 610 may further include or be in communication with a client device, which may include a display device. The client device may be available for an administrator to use in interfacing with the computing device 610, such as to review operation of a virtual computing instance, make improvements to machine learning models and so forth.

Various applications may be stored in the memory device 620 and may be executable by the processor(s) 612. Components or modules discussed in this description that may be implemented in the form of software using high programming level languages that are compiled, interpreted or executed using a hybrid of the methods.

The computing device 610 may also have access to I/O (input/output) devices 614 that are usable by the computing devices. An example of an I/O device 614 is a display screen that is available to display output from the computing devices. Other known I/O device may be used with the computing device as desired. Networking devices 616 and similar communication devices may be included in the computing device 610. The networking devices 616 may be wired or wireless networking devices 616 that connect to the internet, a LAN, WAN, or other computing network.

The components or modules that are shown as being stored in the memory device 620 may be executed by the processor 612. The term "executable" may mean a program file that is in a form that may be executed by a processor 612. For example, a program in a higher level language may be compiled into machine code in a format that may be loaded into a random access portion of the memory device 620 and executed by the processor 612, or source code may be loaded by another executable program and interpreted to generate instructions in a random access portion of the memory to be executed by a processor 612. The executable program may be stored in any portion or component of the memory device 620. For example, the memory device 620 may be random access memory (RAM), read only memory (ROM), flash memory, a solid state drive, memory card, a hard drive, optical disk, floppy disk, magnetic tape, or any other memory components.

The processor 612 may represent multiple processors and the memory 620 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. A computer implemented method, comprising:
   receiving, by a computing system, a request to participate in an unstructured lab, in a testing environment hosted in a service provider environment, from a client device, the unstructured lab being related to management operations of resources of the service provider environment;
   defining a macro task for the unstructured lab in response to the request, the macro task including a plurality of sub-tasks, each of the plurality of sub-tasks having an expected value, wherein the expected value identifies a specific application programming interface (API) call related to completion of a specific sub-task;
   providing the macro task to the client device absent definition of the plurality of the sub-tasks;
   receiving input from the client device related to completion of the macro task in the service provider environment;
   collecting metrics from the unstructured lab using a monitoring service that monitors a metrics collector in the service provider environment wherein a portion of the metrics comprise API calls, related to completion of the macro task, from the client device to the service provider environment, wherein the monitoring service is scalable to monitor multiple testing environments, wherein the unstructured lab is completed within a virtual private cloud in the service provider environment with an attached elastic block storage running in a test account;

performing a comparison of the metrics to the expected values of the sub-tasks using the computing system by determining whether the specific API call was made by the client device to the service provider environment to complete the specific sub-task;

scoring performance of the macro task based on the comparison of the metrics to the expected values; and providing a report of the scored performance to the client device.

2. The method of claim 1, further comprising indicating, in the report, completion of the sub-tasks.

3. The method of claim 1, wherein an order of completion for the sub-tasks is unrestricted.

4. The method of claim 1, wherein collecting the metrics comprises using a plurality of different types of metrics collectors to monitor for multiple expected values for the sub-tasks.

5. A computing device that is configured to provide a test environment, comprising:

a processor;

a memory in electronic communication with the processor;

instructions stored in the memory, the instructions being executable by the processor to perform a method comprising:

defining a macro task for an unstructured lab in a test environment hosted in a service provider environment, the unstructured lab being related to management operations of resources of the service provider environment resource, the macro task including a task definition and expected values for a plurality of sub-tasks within the macro task, wherein the expected values identify a specific application programming interface (API) call related to completion of a specific sub-task, wherein the unstructured lab is modified via a user interface;

receiving a request to participate in the unstructured lab, the unstructured lab being related to service provider environment resources;

providing the macro task in response to the request;

receiving input from a user related to the macro task;

collecting metrics from the unstructured lab using a metrics collector wherein a portion of the metrics comprise API calls, related to completion of the macro task, from the user to the service provider environment;

analyzing completion of the macro task by comparing the metrics to the expected values by determining whether the specific API call was made by the client device to the service provider environment to complete the specific sub-task; and providing a report indicative of performance of the macro task, wherein the report includes mistakes made in the unstructured lab and correct solutions to the unstructured lab.

6. The computing device of claim 5, wherein the task definition is defined by tuples including an API name, API call and expected value for at least one of the plurality of sub-tasks.

7. The computing device of claim 6, wherein the tuples are linear or nested.

8. The computing device of claim 5, wherein the method further comprises withholding the plurality of sub-tasks from a client device.

9. The computing device of claim 5, wherein the method further comprises storing the metrics in a persistent data store and analyzing the completion of the macro task based on the metrics stored in the persistent data store at a completion of the unstructured lab.

10. The computing device of claim 5, wherein analyzing the completion of the macro task further comprises monitoring completion of the sub-tasks during completion of the unstructured lab and analyzing the completion of the sub-tasks during completion of the unstructured lab.

11. The computing device of claim 5, wherein the method further comprises identifying mistakes in performance of the macro task by identifying where the metrics differ from the expected values and reporting the mistakes in the report.

12. The computing device of claim 5, wherein the unstructured lab is defined by a test definition specifying the sub-tasks to be completed and further specifying best practices for completing the sub-tasks.

13. The computing device of claim 12, wherein the method further comprises providing a higher score for completion of the sub-tasks according to the best practices than for completion of the sub-tasks with variance from the best practices.

14. The computing device of claim 5, wherein the method further comprises collecting the metrics and analyzing completion of the sub-tasks at set periodic intervals during the unstructured lab.

15. The computing device of claim 5, wherein the method further comprises receiving a definition of the unstructured lab from a third party, hosting the unstructured lab in a service provider environment, and providing the unstructured lab to a user registered with the third party and the service provider environment.

16. A non-transitory computer-readable medium, having instructions embodied thereon, the instructions when executed cause a processor to implement a test environment, comprising:

defining a macro task for an unstructured lab in a test environment hosted in a service provider environment, the unstructured lab being related to management operations of resources of the service provider environment resource, wherein the management operations include setup, operations, or maintenance of the resources, the macro task including a task definition and expected values for a plurality of sub-tasks within the macro task, wherein the expected values identify a specific application programming interface (API) call related to completion of a specific sub-task, wherein the task definition is defined by tuples, wherein the unstructured lab is modified via a user interface;

receiving a request to participate in the unstructured lab, the unstructured lab being related to service provider environment resources;

providing the macro task in response to the request;

receiving input from a user related to the macro task;

collecting metrics from the unstructured lab using a metrics collector wherein a portion of the metrics comprise API calls, related to completion of the macro task, from the user to the service provider environment;

analyzing completion of the macro task by comparing the metrics to the expected values by determining whether the specific API call was made by the client device to the service provider environment to complete the specific sub-task; and providing a report indicative of performance of the macro task to identify areas of weakness, wherein the report includes mistakes made in the unstructured lab and correct solutions to the unstructured lab.

17. The non-transitory computer-readable medium of claim 16, wherein the report includes metrics from a plurality of different networked sources including at least API calls and an operating system daemon.

18. The non-transitory computer-readable medium of claim 16, further comprising a monitoring service configured to collect metrics from the unstructured lab through instrumentation of the unstructured lab.

19. The non-transitory computer-readable medium of claim 16, wherein the report provides a score for the performance of completion of the macro task.

20. The non-transitory computer-readable medium of claim 19, wherein the plurality of sub-tasks are withheld from a client device.

* * * * *